United States Patent [19]

Marr

[11] Patent Number: 5,338,464
[45] Date of Patent: Aug. 16, 1994

[54] OIL SPILL RECOVERY APPARATUS AND METHOD

[76] Inventor: Leonard D. Marr, P.O. Box 2255, Denton, Tex. 76202

[21] Appl. No.: 927,140

[22] Filed: Aug. 7, 1992

[51] Int. Cl.⁵ .............................................. B01D 17/02
[52] U.S. Cl. .................. 210/776; 210/242.3; 210/923; 405/66; 405/67
[58] Field of Search ...................... 210/241, 242.1, 242, 210/3, 776, 923, 892; 405/66, 67

[56] References Cited

U.S. PATENT DOCUMENTS

| | | |
|---|---|---|
| 3,700,108 | 10/1972 | Richards. |
| 3,737,040 | 6/1973 | Bryday. |
| 4,120,793 | 10/1978 | Strain. |
| 4,182,679 | 1/1980 | Van Hekle. |
| 4,257,889 | 3/1981 | Wober et al.. |
| 4,511,470 | 4/1985 | Ayroldi. |
| 4,653,421 | 3/1987 | Ayers et al.. |
| 4,795,567 | 1/1989 | Simpson et al.. |
| 4,851,133 | 7/1989 | Rymal. |
| 4,959,143 | 9/1990 | Kaster .............................. 210/242.3 |
| 4,963,772 | 10/1990 | Garrett ............................ 210/242.3 |
| 5,019,277 | 5/1991 | Andelin. |
| 5,102,540 | 4/1992 | Conradi et al. ................... 210/242.3 |
| 5,173,182 | 12/1992 | Debellian ......................... 210/242.3 |

*Primary Examiner*—Robert A. Dawson
*Assistant Examiner*—W. L. Walker
*Attorney, Agent, or Firm*—James E. Bradley

[57] ABSTRACT

An oil spill recovery barge utilizes a tank that will pivot about an axis from an upper position to a lower position. The barge has a pair of pontoons, with the tanks located between them. The tank mounts by axles to the pontoons to allow the rotational movement. A flexible buoyant barrier or line extends in a large loop in front of the barge. A puller will gradually pull the line in to constrict the loop to collect the oil spill. A primary separator separates some of the oil from the water and pumps it into a tank. A secondary separator in the tank further separates oil from water and pumps the water from the tank, leaving a greater concentration of oil in the tank. Bridges interconnect the pontoons at the forward and rearward ends. The bridges have flexible joints that allow the pontoons to flex due to wave action.

16 Claims, 3 Drawing Sheets

OIL SPILL RECOVERY APPARATUS AND METHOD

BACKGROUND OF THE INVENTION

1. Field Of The Invention

This invention relates in general to equipment for recovering oil spilled on a body of water, and in particular to an apparatus mounted on pontoons and which has a submergible tank.

2. Description Of The Prior Art

Oil spills on a body of water occur because of accidents in shipping or producing oil. A variety of equipment can be employed to try to recover the oil before it reaches shore. Most of the equipment is large and complex. As a result, it is difficult to get the equipment to the site of the oil spill in time to recover the oil before it breaks up or reaches shore.

SUMMARY OF THE INVENTION

In this invention, an apparatus is provided that has a tank mounted to a flotation means, such as a pair of pontoons. The mounting means for mounting the tank to the flotation means allows pivotal movement of the tank. While the tank is empty, it will float on the surface. As the tank fills with oil being recovered, it will gradually sink to a submerged position.

In the preferred embodiment, the tank has opposite sides that are parallel with the longitudinal axis of the pontoons. The mounting means comprises axles that support the tank for rotation about the rotational axis. Bridges extend between the pontoons forward and rearward of the tank. The bridges are mounted flexibly to the pontoons to allow the pontoons to flex due to wave action. The flexible connections are biased to return the pontoons to a position in which their longitudinal axes are parallel to each other.

To recover the oil, a skimmer skims a surface layer of the body of water and directs it to a pump which pumps the water into a separator. The separator separates oil from the skimmed layer. The separator and pump return the water to the vicinity of the skimmer and the separated oil product into the tank. Preferably, a secondary separator locates in the tank. The secondary separator further separates water from the oil then returns the water to the vicinity of the skimmers.

To draw the oil spill into the skimmer area, a floating flexible barrier is employed. The barrier is a line that has one end attached to the barge. The barrier makes a large loop. Another end is drawn through a puller. The puller gradually constricts the area of the loop to draw the surface layer of the oil spill into the skimmer. A number of barges may be connected together by utilizing a single floating barrier.

DETAILED DESCRIPTION OF THE INVENTION

Figure 1:
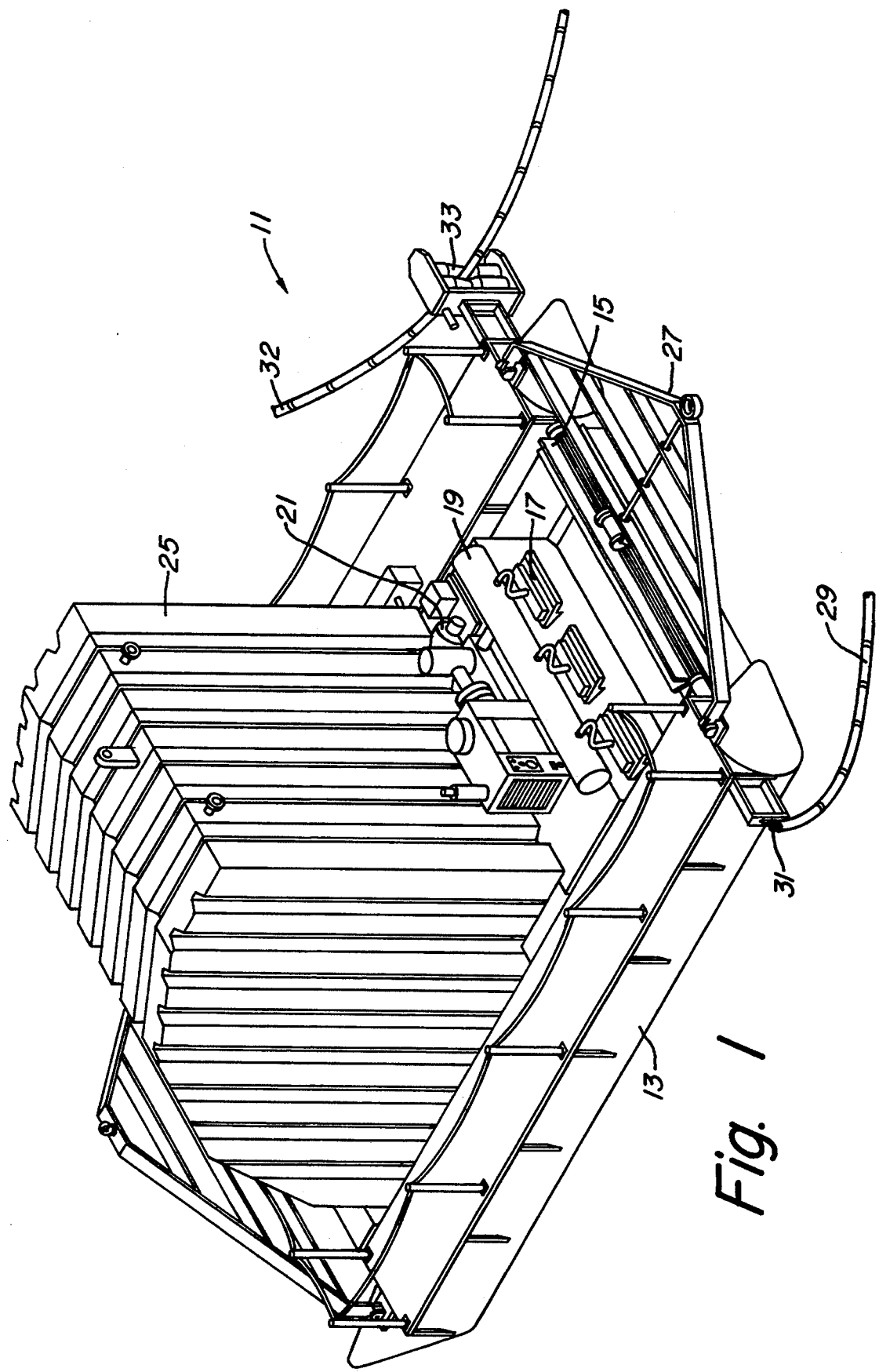
FIG. 1 is a perspective view illustrating an apparatus for recovering oil spills constructed in accordance with this invention and showing the tank in an upper position floating on the surface of the water.

Referring to FIG. 1, barge 11 has flotation means which comprises a pair of pontoons 13. Each pontoon 13 is generally cylindrical and has a longitudinal axis, the axes being parallel to each other. Pontoons 13 are spaced apart from each other. A set of paddles 15 locate at the forward end of barge 11, extend between pontoons 13, and are rotated to force a surface layer of the water rearward between the pontoons 13.

Figure 3:
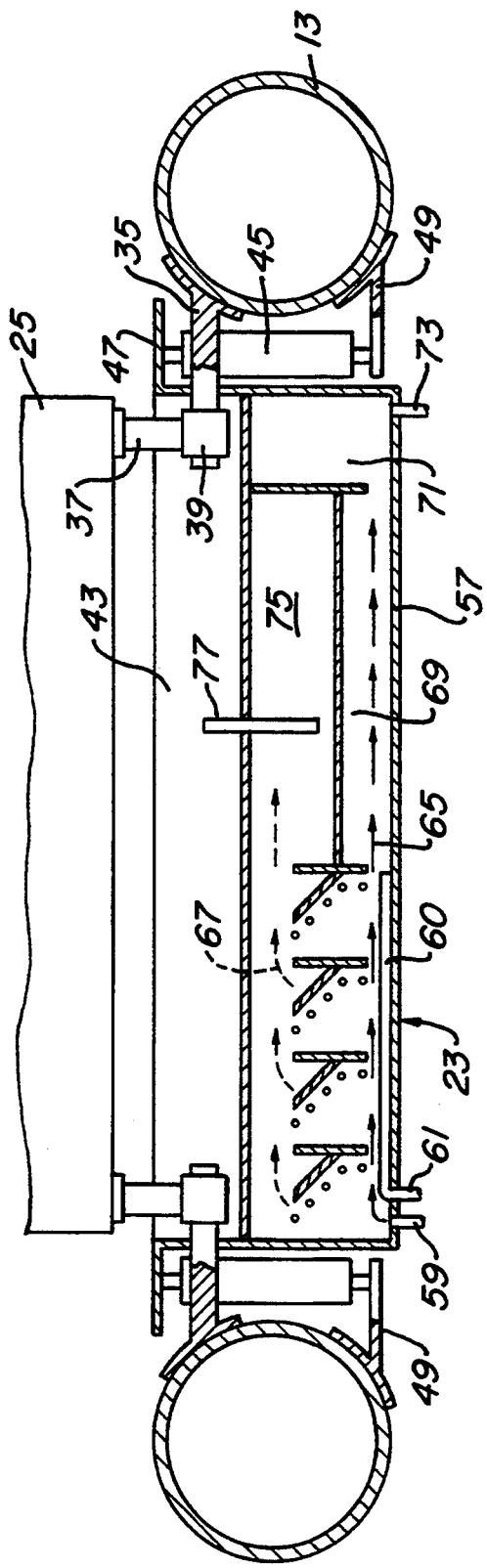
FIG. 3 is a schematic, partial sectional view of the apparatus of FIG. 1, shown along the line III—III of FIG. 2.

Collectors or skimmers 17 comprise suction heads which will skim the surface layer as being propelled rearward by paddles 15. Collectors 17 direct the surface layer into an intake manifold 19 of a pumping assembly 21, which creates suction at collectors 17. Pumping assembly 21 pumps the liquid, which would be oil mixed with water, to a separator 23 (FIG. 3). Separator 23 separates at least part of the oil from the water and delivers a separated oil product to a tank 25. Separator 23 returns the water to the vicinity of collectors 17. A tow bar 27 mounts on both the forward and rearward ends of barge 11 for towing barge 11 or connecting it to other barges of similar type.

A flexible floating barrier 29 is employed to assist in drawing the oil spill inward into the area of paddles 15. Barrier 29 is a cable that has cylindrical floats mounted to it for providing buoyancy to the cable. Barrier 29 may be quite long so that it can be drawn into a large loop. A fixed end 31 of barrier 29 secures to the forward end of one of the pontoons 13. A free end 32 feeds through a puller 33. Puller 33 comprises a pair of rollers which pinch the barrier 29 and rotate to pull barrier 29 rearward. A drive means (not shown) will energize puller 33 to cause it to slowly pull barrier 29 inward. This constricts the loop of barrier 29, drawing the oil spill inward. Free end 32 may be drawn through a puller 33 of another barge 11, rather than the puller 33 of the barge to which its fixed end 31 is secured. A number of barges 11 may be linked together in this manner so that one barrier 29 operates in cooperation with a number of barges 11.

Figure 2:
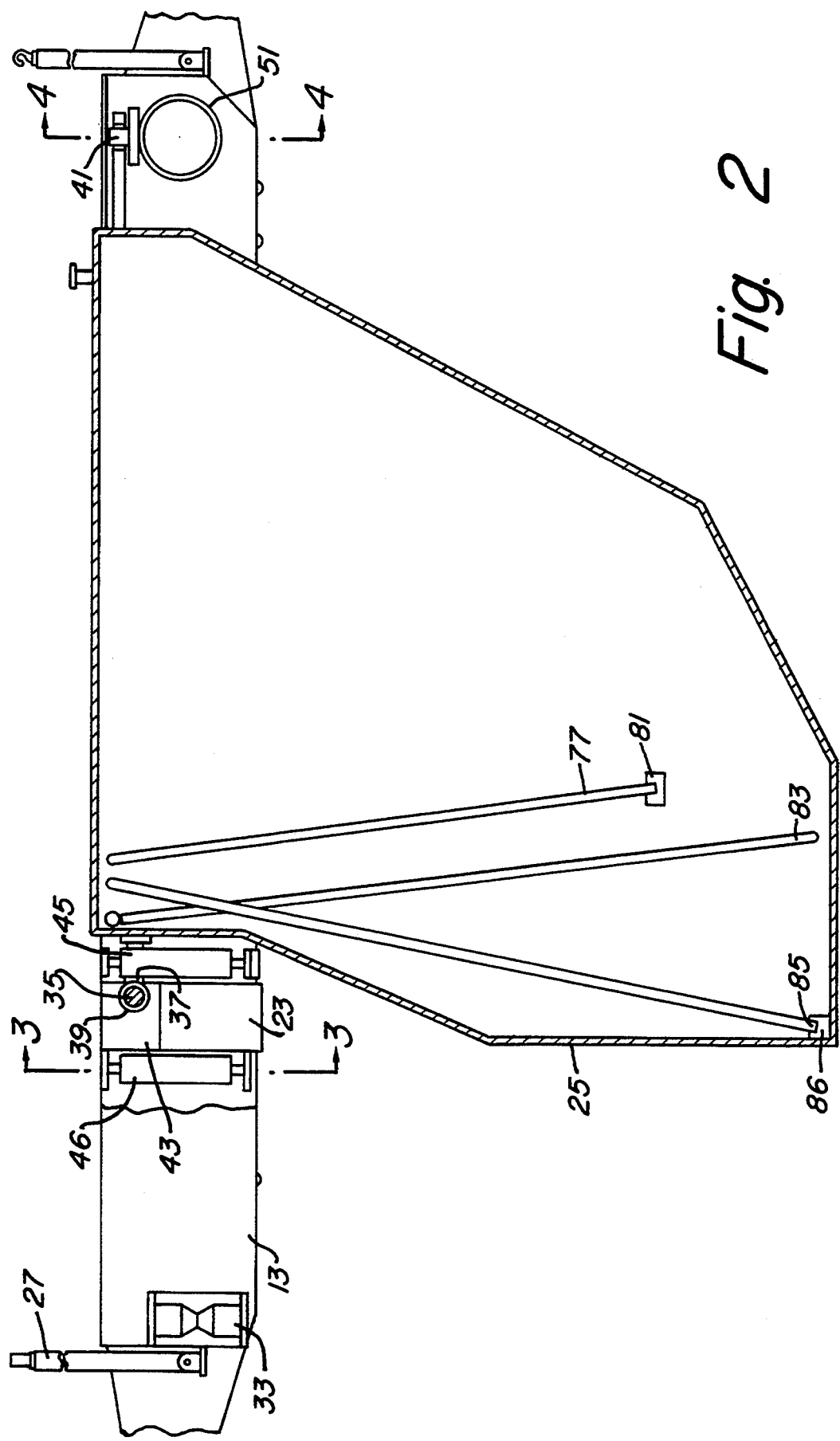
FIG. 2 is a schematic, partially sectional view of the apparatus of FIG. 1, showing the tank in a submerged position.

Tank 25 has an irregular shape, with a flat front side 25a, which becomes the top when submerged as illustrated in FIG. 2. Tank 25 has two parallel flat sides 25b, a rear side 25c, which becomes the bottom when submerged, a top 25d, which becomes the rear side when submerged, and a bottom 25e (FIG. 2), which becomes a forward side when submerged. Sides 25b are parallel to each other and perpendicular to front side 25a. Rear side 25c has a portion that is parallel to front side 25a, but comprises two flat surfaces, each at a different angle. Top 25d also comprises two flat surfaces at an angle relative to each other. Bottom 25e is made up of three flat surfaces.

As can be seen by comparing FIGS. 1 and 2, tank 25 will move between an upper position shown in FIG. 1, in which it floats with its bottom 25e near the surface of the water, to a lower submerged position shown in FIG. 2. In the lower position shown in FIG. 2, a large portion of tank 25 will be submerged and extending below pontoons 13. In the upper position, bottom 25e of tank 25 will be no deeper than pontoons 13. Preferably, tank 25 gradually submerges as it is filled with separated oil.

As shown in FIGS. 2 and 3, the pivotal movement is allowed by means of two axles 35. Axles 35 are rigidly mounted to each pontoon 13 and extend toward each other. Axles 35 have a common axis that is perpendicular to the longitudinal axes of pontoons 13. A pair of arms 37 secure rigidly to the forward end of tank 25. Each arm 37 mounts rigidly to a sleeve 39. Each sleeve 39 mounts on one of the axles 35 for rotation. Arms 37 will rotate 90 degrees between the position shown in FIG. 1 and the position shown in FIG. 2. FIG. 1 shows the arms 37 in an upright vertical position, while FIG. 2 shows the arms 37 in a horizontal position.

While in the lower submerged position of FIG. 2, a latch 41 will releasably latch tank 25 in place. Latch 41 is shown schematically, and preferably comprises a spring biased member which automatically latches as the tank 25 reaches the lower position. Additionally, a latch (not shown) may be employed to latch tank 25 in the upper position.

Pontoons 13 are connected together by a forward bridge 43, shown in FIGS. 2 and 3. Forward bridge 43 is a rectangular box-like member that extends approximately the same length as the width of tank 25. Forward bridge 43 has connection means for connecting each end of forward bridge 43 to one of the pontoons 13.

The connection means is flexible so as to allow pontoons 13 to flex and move slightly due to wave action. The connection means also tends to return pontoons 13 to the normal position in which the axes are parallel with each other.

In the preferred embodiment, the connection means comprises two hydraulic cylinders 45, 46 on each side of forward bridge 43. Hydraulic cylinders 45, 46 contain hydraulic fluid and are connected to an accumulator (not shown). Hydraulic cylinders 45, 46, the accumulator, and the associated hydraulic circuitry tend to cause the cylinders 45, 46 to equalize to dampen wave movement. One end of each hydraulic cylinder 45, 46 mounts to a bridge bracket 47, which is rigidly connected to forward bridge 43. The other end of each hydraulic cylinder 45, 46 mounts to a pontoon bracket 49, which rigidly mounts to one of the pontoons 13.

Figure 4:
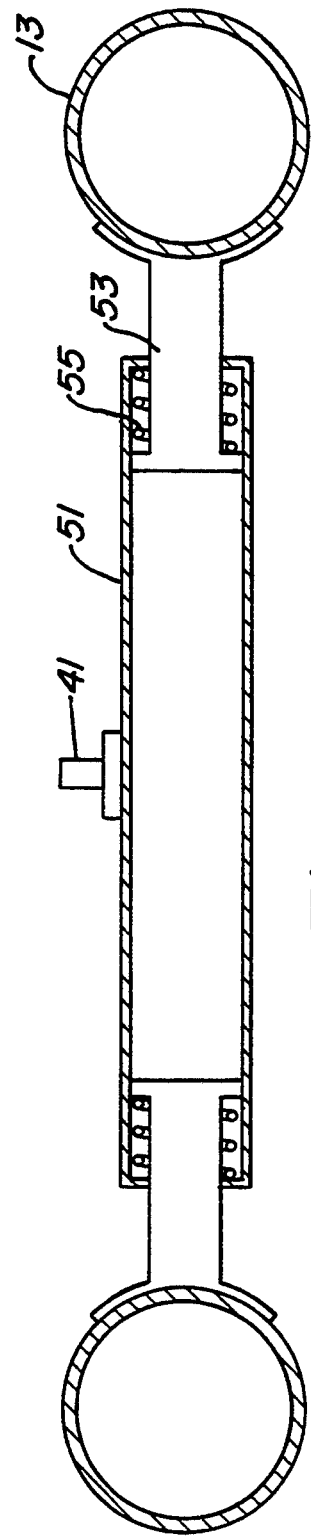
FIG. 4 is a schematic, partial sectional view of the apparatus of FIG. 1, taken along the line IV—IV.

Pontoons 13 are also connected together by a rearward bridge 51, located rearward of tank 25 as shown in FIG. 4. Rearward bridge 51 also has flexible connection means for allowing wave movement of the pontoons 13 relative to each other due to wave action. Rearward bridge 51 is telescoping, allowing its length to change. Rearward bridge 51 includes telescoping ends 53, each of which slides telescopingly within a central member of rearward bridge 51. A spring 55 urges the telescoping ends 53 toward each other to urge the pontoons 13 to align with each other. Spring 55 is carried concentrically in the annular space between the telescoping end 53 and the central portion of rearward bridge 51.

Referring again to FIG. 3, in the preferred embodiment, separator 23 includes a rectangular housing 57 which is joined to and forms the lower portion of forward bridge 43. Housing 57 has a liquid intake 59 into which the skimmed layer is pumped by pump 21 (FIG. 1). An air inlet 61 extends into housing 57 at the same end, adjacent intake 59. Air inlet 61 includes a tube 60 that extends along the bottom of the interior of housing 57. Tube 60 has slits in it to cause bubbles to flow upward at several points along the length of tube 60. Tube 60 extends approximately half the length of housing 57.

A plurality of baffles 63 (four shown) are mounted in housing 57. Each baffle 63 has a vertical portion and an inclined portion. Each baffle 63 extends only part way across the depth of housing 57, the depth referring to the direction parallel with the longitudinal axes of pontoons 13. Baffles 63 tend to change the direction of flow of the bubbles to cause them to collect and attach to oil droplets in the liquid entering through intake 59. As indicated by solid arrows 65, water, which comprises the heavier components of the liquid entering, flows under the baffles 63. The lighter components, such as the separated oil, flow upward as indicated by the dashed arrows 67. The lighter oilier component flows up over the baffles 63 toward the right.

The heavier component, mostly water, flows around the rear sides of baffles 63 and under baffles 63. The heavier component enters a water conduit 69 located in the bottom of housing 57. The water flows from water conduit 69 into a water chamber 71. The water is pumped by pumping assembly 21 (FIG. 1) out of water chamber 71 through outlet 73 and back into the area of the skimmers or collectors 17. Some of this water will be recycled through the separator 23 again for further separation of oil.

The oilier mixture flows also to the right as shown in FIG. 3, flowing into an oil chamber 75 which is located above water conduit 69. An outlet 77 draws the oilier component from oil chamber 75 and pumps it via pump assembly 21 into tank 25.

Referring to FIG. 2, the oil product, which will still be mixed with some water at this point, flows from the outlet 77 against a splash plate 81 in the interior of tank 25. A second separation occurs in tank 25. This is assisted by an air line 83 which extends along the interior side of rear side 25c, which will be the bottom of tank 25 when it is in the lower position. Air line 83 is a slitted tube that extends across the width of tank 25. Air line 83 causes bubbles to bubble upward which will create a barrier between and separate water from oil.

Tank drain or outlet 85 connects to the suction of part of the pump assembly 21 (FIG. 1) for pumping separated water back out of tank 25. Outlet 85 is a conduit extending to a point near the corner between rear side 25c and bottom 25e, which will be the lowest point of tank 25 when it is in the lower position shown in FIG. 2. An oil/water sensor 86 is located in the outlet conduit, such as at the intake of outlet 85. Sensor 86 is a conventional device that will detect the presence of oil in water, and if the amount is sufficient, will provide an electrical signal. The electrical signal will signal the pumping assembly 21 to cease pumping liquid from tank 25 back out of tank 25 when oil is sensed. If oil is sensed, the contents contained in the outlet conduit are pumped back into tank 25. A timer associated with pumping assembly 21 and sensor 86 repeats this process on a timed basis.

In operation, barge 11 can be stored in shallow water or on land with its tank 25 in the upper position. While being towed with tank 25 empty, its natural buoyancy will maintain itself in the upper position. There will be very little drag due to tank 25 as when in the upper position, its bottom 25e will be located no deeper than the lower sides of the pontoons 13.

If a spill occurs, the operator will tow the barge 11 to the area. Flexible barrier 29 may be deployed to form a large loop encircling all or a large part of the oil spill. Free end 32 may be threaded through puller 33 of the same barge 11, if only one barge 11 is used, or through puller 33 of another barge 11, if a number of barges 11 are used. Puller 33 will be rotated to begin constricting the loop created by flexible barrier 29. This draws the oil spill into the vicinity of paddles 15.

The paddles 15 are rotatably driven to force the oil into the collectors 17, which deliver the surface layer of the body of water to manifold 19. Pump 21 pumps the surface layer to separator 23, shown in FIG. 3.

The mixed oil and water enters through intake 59. Separator 23 separates some of the oil from the water, with the oilier mixture being collected in oil chamber 75, as indicated by arrows 67, and the less oily water being collected in water chamber 71, as indicated by arrows 65. Air bubbles being discharged through tube 60 assist with baffles 63 in causing the separation. The heavier components are pumped out outlet 73 into the vicinity of collectors 17 (FIG. 1). The lighter components are pumped out outlet 77 into tank 25.

Tank 25 will begin to fill. Air in tank 25 will be displaced out a vent (not shown). The weight of the liquid in tank 25 causes it to gradually submerge. As it submerges, it will pivot and rotate about axles 35. Referring to FIG. 2, when submerged, bottom 25e becomes generally vertical, rear side 25c becomes the bottom, top 25d becomes the rear side, and front 25a becomes the top.

Air will be discharged out air tube 83 to cause further separation. Sensor 86 will monitor the quality of the liquid in the bottom of tank 25. If it indicates that the liquid in the bottom is essentially oil free water, then it will initiate pumping assembly 21 (FIG. 1) to pump the liquid from the bottom of tank 25 into the vicinity of the collectors 17 (FIG. 1). Once sensor 86 senses that the liquid has a high enough content of oil, then it will close a valve or turn off a pump associated with pumping assembly 21 to prevent liquid from being pumped out of tank 25. In this manner, a secondary separation occurs in tank 25, with the content of the liquid in the tank gradually becoming oilier. The operation of sensor 86 and the recycling of liquid from tank 25 repeats itself automatically on a timed basis. A point will likely be reached in which sensor 86 will not recycle any liquid from tank 25. At that point, if tank 25 is full, the oil will be pumped from tank 25 into a storage vessel or a storage tank on land for disposal.

If wave action exists on the body of water, some flexing of the pontoons 13 will occur. The hydraulic cylinders 45, 46 will allow flexing movement between the pontoons 13 due to wave action. Hydraulic cylinders 45, 46 tend to return pontoons 13 to parallel positions. Similarly, telescoping ends 53 will allow one pontoon 13 to rise relative to the other due to wave action. Spring 55 tends to return the rearward ends of pontoons 13 to parallel positions.

If the wave action is too severe, the operator may wish to initially submerge tank 25 prior to collecting oil in order to stabilize barge 11. The operator will fill tank 25 with water and submerge it at the beginning of the process. As the oil flows into the tank 25, the outlet 85 and pumping assembly 21 will cause water to be gradually displaced out of tank 25.

After cleanup, the operator will tow barges 11 back to shore. If the operator wishes, he may tow the barges with the tank 25 submerged for stability. The tanks 25 may contain collected oil during the towing procedure, in which case the collected oil may be pumped ashore to a disposal facility. Barges 11 may be stored in shallow water or on a dock area or beach area by emptying tanks 25 and allowing them to move to the upper position shown in FIG. 1.

The invention has significant advantages. The barge separates water from the oil collected while at sea. The large tank will support a fairly large quantity of separated oil. The tank gradually submerges for stability. The tank when empty will move to an upper position to allow it to be placed in shallow water or on land. The flexible barrier effectively draws the oil into the vicinity for collection and prevents spreading of the oil spill. The primary and secondary separators gradually increase the content of the oil collected in the tank. This reduces the amount of storage space needed for storing the liquid to be eventually disposed.

While the invention has been shown in only one of its forms, it should be apparent to those skilled in the art that it is not so limited but is susceptible to various changes without departing from the scope of the invention.

I claim:

1. An apparatus for recovering oil spilled on a body of water, comprising in combination:
    a tank;
    collection means and a separator means for skimming oil and oil mixed with water from the surface of the water, for separating the oil skimmed from at least part of the water mixed with the oil into a separated product, and means for pumping the separated product into the tank;
    flotation means in engagement with the collection means and separator means for causing the collection means and separator means to float; and
    mounting means for pivotally mounting the tank to the flotation means for allowing the tank to pivot relative to the flotation means and move downward gradually relative to the flotation means as the tank fills with the separated product; and
    wherein:
    the flotation means comprises a pair of pontoons positioned on opposite sides of the tank, the pontoons having parallel longitudinal axes; and
    the mounting means comprises:
    axle means mounted between the pontoons and the tank and having a rotational axis that is perpendicular to the longitudinal axes of the pontoons for allowing the tank to pivot around the rotational axis between an upper position and a lower position.

2. An apparatus for storing oil that has been spilled on a body of water and skimmed from the body of water, comprising in combination:
    a tank;
    a pair of pontoons positioned on opposite sides of the tank; and
    mounting means mounted between the pontoons and the tank and having a rotational axis for allowing the tank as it gradually fills with the oil to pivot relative to the pontoons around the rotational axis from an upper position when empty to a lower position more deeply submerged; and
    wherein the pontoons have parallel longitudinal axes, and wherein the rotational axis is perpendicular to the longitudinal axes.

3. An apparatus for storing oil that has been spilled on a body of water and skimmed from the body of water, comprising in combination:
    a tank;
    a pair of pontoons positioned on opposite sides of the tank; and mounting means mounted between the pontoons and the tank and having a rotational axis for allowing the tank as it gradually fills with the oil to pivot relative to the pontoons around the rotational axis from an upper position when empty to a lower position more deeply submerged; and wherein:

the pontoons have parallel longitudinal axes;

the opposite sides of the tank are parallel to each other and to the longitudinal axes;

the tank has forward and rearward ends joining the opposite sides; and the rotational axis is located perpendicular to the longitudinal axes.

4. An apparatus for storing oil that has been spilled on a body of water and skimmed from the body of water, comprising in combination:

a tank having a forward end, a rearward end, and opposite sides which are parallel to each other and perpendicular to the forward and rearward ends;

a pair of pontoons having parallel longitudinal axes, the tank being located between the pontoons with the sides of the tank being parallel to the longitudinal axes; and an axle shaft mounted to each of the pontoons, the axle shafts having a common rotational axis perpendicular to the longitudinal axes; and mounting means for mounting the axle shafts to each side of the tank for allowing the tank as it gradually fills with the oil to swing relative to the pontoons around the rotational axis from an upper position when empty to a lower position more deeply submerged.

5. The apparatus according to claim 4 further comprising:

a forward bridge connected between the pontoons forward of the tank; and a rearward bridge connected between the pontoons rearward of the tank.

6. The apparatus according to claim 4 further comprising:

a forward bridge extending between the pontoons forward of the tank;

a rearward bridge extending between the pontoons rearward of the tank; and forward connection means at the forward bridge for connecting the forward bridge to each of the pontoons, the forward connection means being flexible for allowing wave action movement of the pontoons relative to the bridge and to each other, the forward connection means being resilient for urging the pontoons into a position in which the longitudinal axes remain parallel to each other and perpendicular to the forward bridge.

7. The apparatus according to claim 4 further comprising:

a forward bridge extending between the pontoons forward of the tank;

a rearward bridge extending between the pontoons rearward of the tank;

forward connection means at the forward bridge for connecting the forward bridge to each of the pontoons, the forward connection means being flexible for allowing wave action movement of the pontoons relative to the forward bridge and to each other, the forward connection means being resilient for urging the pontoons into a position in which the longitudinal axes remain parallel to each other and perpendicular to the forward bridge; and rearward connection means at the rearward bridge for connecting the rearward bridge to each of the pontoons, the rearward connection means being flexible for allowing wave action movement of the pontoons relative to the rearward bridge and to each other, the rearward connection means being resilient for urging the pontoons into a position in which the longitudinal axes remain parallel to each other and perpendicular to the rearward bridge.

8. The apparatus according to claim 4 further comprising:

a forward bridge extending between the pontoons forward of the tank;

a rearward bridge extending between the pontoons rearward of the tank;

forward connection means at the forward bridge for connecting the forward bridge to each of the pontoons comprising a pair of hydraulic cylinder means for allowing wave action movement of the pontoons relative to the bridge and to each other, and for urging the pontoons toward a position in which the longitudinal axes remain parallel to each other and perpendicular to the forward bridge.

9. The apparatus according to claim 4 further comprising:

a forward bridge extending between the pontoons forward of the tank;

a rearward bridge extending between the pontoons rearward of the tank;

forward connection means at the forward bridge for connecting the forward bridge to each of the pontoons, the forward connection means being flexible for allowing wave action movement of the pontoons relative to the forward bridge and to each other, the forward connection means being resilient for urging the pontoons into a position in which the longitudinal axes remain parallel to each other and perpendicular to the forward bridge; and the rearward bridge comprising a telescoping member connected to each of the pontoons.

10. The apparatus according to claim 4, further comprising latch means for releasably retaining the tank in the submerged position.

11. An apparatus for recovering oil spilled on a body of water, comprising in combination:

a tank;

skimmer means located adjacent the tank for skimming a surface layer from the body of the water;

primary separation means located adjacent the skimmer means for receiving the surface layer from the skimmer means, for separating from the surface layer at least part of the oil into a separated product, for means for pumping the separated product into the tank, and pumping the remainder of the surface layer back to the vicinity of the skimmer means;

secondary separation means in the tank for further separating oil from the separated product, for retaining the oil in the tank and means for pumping the remainder of the separated product back to the vicinity of the skimmer means;

flotation means in engagement with the separation means for causing the separation means to float; and mounting means for pivotally mounting the tank to the flotation means for allowing the tank to pivot relative to the flotation means and move downward gradually relative to the flotation means as the tank fills with the separated product.

12. The apparatus according to claim 11 wherein the flotation means comprises a pair of pontoons.

13. The apparatus according to claim 11 wherein:
the flotation means comprises a pair of pontoons positioned on opposite sides of the tank, the pontoons having parallel longitudinal axes; and
the mounting means comprises:
axle means mounted between the pontoons and the tank and having a rotational axis that is perpendicular to the longitudinal axes of the pontoons for allowing the tank to pivot around the rotational axis between an upper position and a lower position.

14. The apparatus according to claim 11, further comprising:
a flexible buoyant barrier, having a first end engaging one side of the flotation means, the barrier extending in a loop and having second end in engagement with another side of the flotation means to entrap oil spilled on the body of water within the loop; and pulling means for pulling one of the ends inward relative to the flotation means to constrict the loop to draw the spilled oil into the skimmer means.

15. A method for recovering oil spilled on a body of water, comprising in combination:
providing a tank;
pivotally mounting the tank about a rotational axis to a flotation means for providing buoyancy to the tank;
skimming a surface layer from the body of water;
separating at least part of the oil from water in the surface layer skimmed into a separated product, and pumping the separated product into the tank; and
allowing the tank to pivot relative to the flotation means about the rotational axis and move downward gradually relative to the flotation means as the tank fills with the separated product.

16. The method according to claim 15, further comprising:
further separating oil from water in the separated product in the tank, and pumping water separated therefrom from the tank.

* * * * *